(12) United States Patent
Altschul et al.

(10) Patent No.: US 9,979,429 B2
(45) Date of Patent: May 22, 2018

(54) MOBILE PHONE CASE WITH ENHANCED GRIP AREA AND REDUCED GRIP AREA

(71) Applicant: Catalyst Medium Four, Inc., Austin, TX (US)

(72) Inventors: Matthew Timothy Altschul, Austin, TX (US); Michael J. Martin, Portland, OR (US); Beejan Soheili, Chula Vista, CA (US)

(73) Assignee: Catalyst Medium Four, Inc., Austin, TX (US)

( * ) Notice: Subject to any disclaimer, the term of this patent is extended or adjusted under 35 U.S.C. 154(b) by 0 days. days.

(21) Appl. No.: 15/454,700

(22) Filed: Mar. 9, 2017

(65) Prior Publication Data
US 2018/0115339 A1    Apr. 26, 2018

Related U.S. Application Data

(60) Provisional application No. 62/411,875, filed on Oct. 24, 2016.

(51) Int. Cl.
| | |
|---|---|
| H04B 1/3888 | (2015.01) |
| A45C 11/00 | (2006.01) |
| A45C 13/00 | (2006.01) |
| A45F 5/00 | (2006.01) |
| H04M 1/02 | (2006.01) |

(52) U.S. Cl.
CPC ............ *H04B 1/3888* (2013.01); *A45C 11/00* (2013.01); *A45C 13/002* (2013.01); *A45F 5/00* (2013.01); *H04M 1/0202* (2013.01); *A45C 2011/002* (2013.01); *A45C 2011/003* (2013.01)

(58) Field of Classification Search
CPC ............................ H04B 1/3888; A45C 11/00
See application file for complete search history.

(56) References Cited

U.S. PATENT DOCUMENTS

| | | |
|---|---|---|
| D357,918 S | 5/1995 | Doria |
| 7,204,398 B1 | 4/2007 | Smith |
| D570,598 S | 6/2008 | Chan |
| D615,078 S | 5/2010 | Bradley |
| D619,130 S | 7/2010 | Fellig |
| D619,356 S | 7/2010 | Hillman |
| D624,064 S | 9/2010 | Esposito |
| D626,119 S | 10/2010 | Fellig |
| D631,246 S | 1/2011 | Boettner |
| 7,933,122 B2 | 4/2011 | Richardson et al. |
| D638,006 S | 5/2011 | Chang |
| D638,007 S | 5/2011 | Chang |
| D644,218 S | 8/2011 | Akana et al. |
| D647,697 S | 11/2011 | Littleton |
| 8,047,364 B2 | 11/2011 | Longinotti-Buitoni |

(Continued)

FOREIGN PATENT DOCUMENTS

WO    2001024072 A1    4/2001

*Primary Examiner* — Tuan H Nguyen
(74) *Attorney, Agent, or Firm* — Scheinberg & Associates, PC; John B. Kelly

(57) ABSTRACT

Embodiments are directed to a mobile phone case adapted in size and shape to removably fit around the exterior of a mobile phone. The mobile phone case comprises an enhanced grip area and a reduced grip area. The enhanced grip area has increased grip as compared to the reduced grip area. The enhanced grip area comprises substantially all of the area of the outer perimeter of the case.

11 Claims, 4 Drawing Sheets

(56) References Cited

U.S. PATENT DOCUMENTS

| | | |
|---|---|---|
| D653,656 S | 2/2012 | Charnas et al. |
| 8,170,259 B2 | 5/2012 | Liu |
| 8,251,210 B2 | 8/2012 | Schmidt et al. |
| 8,256,568 B2 | 9/2012 | Lin |
| 8,295,043 B2 | 10/2012 | Tai et al. |
| D675,606 S | 2/2013 | Adelman et al. |
| 8,381,904 B1 | 2/2013 | Longinotti-Buitoni |
| D678,871 S | 3/2013 | Mishan et al. |
| D679,684 S | 4/2013 | Baker et al. |
| D681,620 S | 5/2013 | Huskinson |
| D681,949 S | 5/2013 | Kershenstein |
| D684,150 S | 6/2013 | Goradesky et al. |
| D688,654 S | 8/2013 | Stevinson |
| D688,655 S | 8/2013 | Rey-Hipolito |
| 8,504,127 B2 | 8/2013 | Altschul et al. |
| D689,851 S | 9/2013 | Chang et al. |
| 8,528,690 B1 | 9/2013 | Wu |
| 8,718,730 B1 * | 5/2014 | LaColla .................. H04M 1/04 455/552.1 |
| 8,726,952 B2 | 5/2014 | Jambunathan et al. |
| D707,965 S | 7/2014 | Requa |
| 8,781,541 B2 | 7/2014 | Dearden |
| 8,833,379 B1 | 9/2014 | Kaplan |
| D720,739 S | 1/2015 | Liu |
| D721,689 S | 1/2015 | Altschul et al. |
| 8,950,582 B2 | 2/2015 | Chang |
| D727,019 S | 4/2015 | DeChant |
| 9,027,746 B2 | 5/2015 | Smith |
| 9,176,532 B2 | 11/2015 | Tages et al. |
| D746,801 S | 1/2016 | Pan |
| D748,612 S | 2/2016 | Chan et al. |
| 9,362,968 B1 | 6/2016 | Haymond |
| D764,167 S | 8/2016 | DeChant |
| D764,449 S | 8/2016 | Chan et al. |
| 9,411,367 B2 | 8/2016 | Johnson et al. |
| 2002/0009195 A1 | 1/2002 | Schon |
| 2008/0010883 A1 | 1/2008 | Morgese |
| 2008/0121322 A1 | 5/2008 | Thomson |
| 2009/0194444 A1 | 8/2009 | Jones |
| 2010/0122756 A1 | 5/2010 | Longinotti-Buitoni |
| 2010/0224519 A1 | 9/2010 | Kao |
| 2010/0230301 A1 | 9/2010 | Fellig |
| 2010/0331155 A1 | 12/2010 | Gorsuch et al. |
| 2011/0077061 A1 | 3/2011 | Danze et al. |
| 2011/0089078 A1 | 4/2011 | Ziemba |
| 2011/0309728 A1 | 12/2011 | Diebel |
| 2012/0021810 A1 | 1/2012 | Terry |
| 2012/0027237 A1 | 2/2012 | Lin |
| 2012/0067751 A1 | 3/2012 | Mongan et al. |
| 2012/0217257 A1 | 8/2012 | Ting |
| 2012/0264491 A1 | 10/2012 | Singhal |
| 2012/0294469 A1 | 11/2012 | Weaver |
| 2012/0303146 A1 | 11/2012 | Genov et al. |
| 2012/0327565 A1 | 12/2012 | Tages et al. |
| 2013/0037187 A1 | 2/2013 | Pizzuta |
| 2013/0095898 A1 | 4/2013 | Altschul et al. |
| 2013/0102368 A1 | 4/2013 | Lee |
| 2013/0170686 A1 | 7/2013 | Lester |
| 2014/0017436 A1 | 1/2014 | Vito et al. |
| 2014/0034546 A1 | 2/2014 | Ziemba |
| 2014/0045555 A1 | 2/2014 | Dearden |
| 2014/0050347 A1 | 2/2014 | Tsai |
| 2014/0165379 A1 | 6/2014 | Diebel et al. |
| 2014/0166390 A1 | 6/2014 | Center et al. |
| 2014/0221056 A1 | 8/2014 | Gandhi et al. |
| 2014/0246355 A1 | 9/2014 | Azzoni |
| 2014/0251534 A1 | 9/2014 | Jambunathan et al. |
| 2014/0323186 A1 | 10/2014 | Boosalis et al. |
| 2014/0364176 A1 | 12/2014 | Pintor |
| 2015/0103018 A1 | 4/2015 | Kamin-Lyndgaard et al. |
| 2015/0270734 A1 * | 9/2015 | Davison ................ H02J 7/0054 320/103 |
| 2016/0044148 A1 | 2/2016 | Pizzo et al. |
| 2016/0262513 A1 | 9/2016 | O'Neill |
| 2016/0285497 A1 | 9/2016 | Roberts et al. |

* cited by examiner

MOBILE PHONE CASE WITH ENHANCED GRIP AREA AND REDUCED GRIP AREA

This Application claims priority from U.S. Provisional Application No. 62/411,875, filed Oct. 24, 2016, which is hereby incorporated by reference. The present invention relates to protective cases for portable electronic devices and mobile phones in particular

TECHNICAL FIELD OF THE INVENTION

Background of the Invention

The widespread use of portable electronic devices, and mobile phones in particular, has led to the need for protective coverings for such devices. The devices are fragile as are most consumer electronics and to an increased degree due to the extensive use of glass touch-sensing display screens. Further, the devices are expensive due to the increased capability of devices such as smartphones and required miniaturization for such powerful, portable computing devices. The combination of portability, fragility, and expense makes protective cases an important addition that is in high demand.

SUMMARY OF THE INVENTION

Embodiments of the present invention are directed to a mobile phone case adapted in size and shape to removably fit around the exterior of a mobile phone. The mobile phone case comprises an enhanced grip area and a reduced grip area. The enhanced grip area has increased grip as compared to the reduced grip area. The enhanced grip area comprises substantially all of the area of the outer perimeter of the case.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
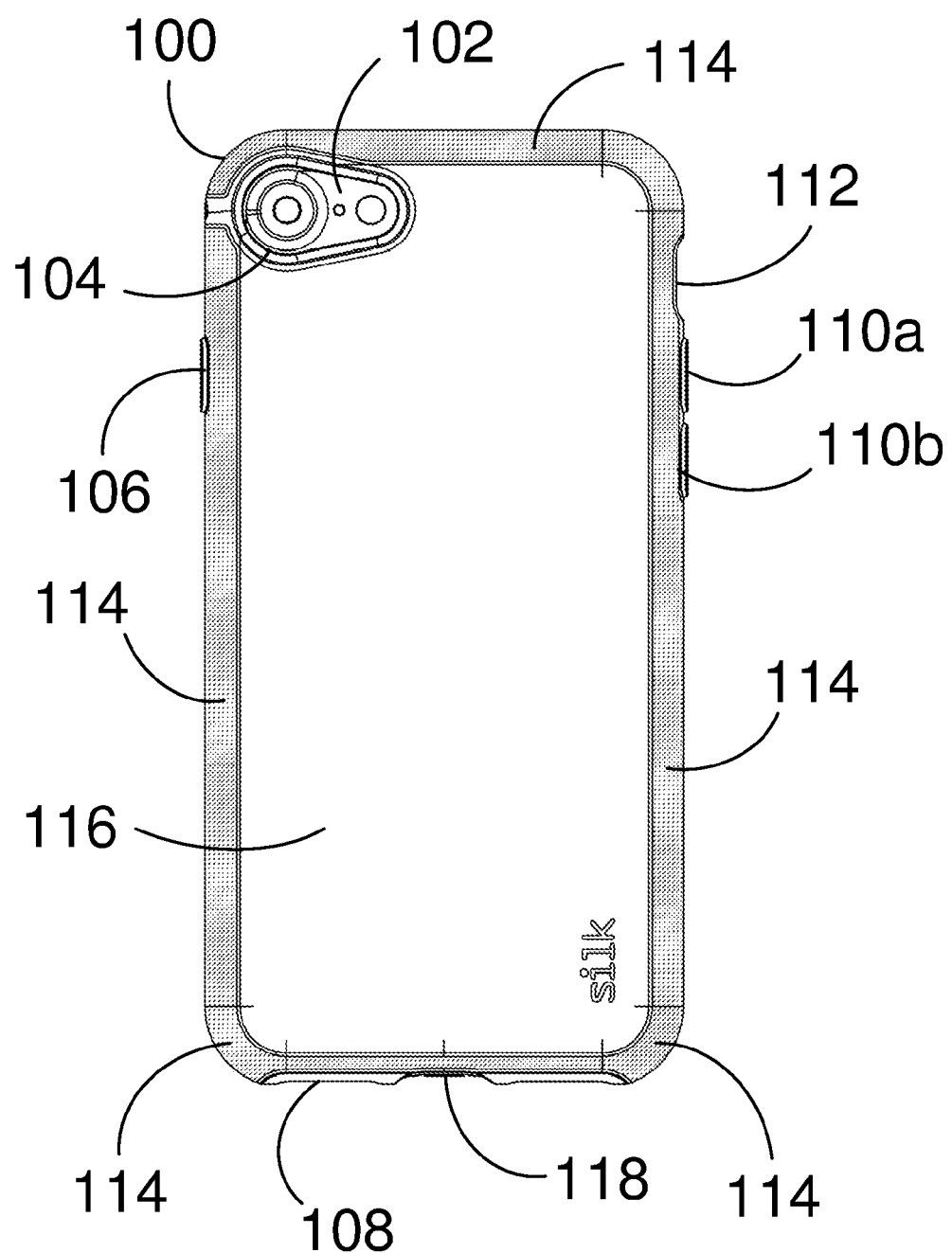
FIG. 1 shows a back view of a mobile phone case (case 100) in accordance with one or more embodiments of the present invention.

Embodiments of the present invention provide a mobile phone case having an enhanced grip area and a reduced grip area. FIG. 1 shows a back view of a mobile phone case (case 100) in accordance with one or more embodiments of the present invention. Case 100 is adapted in size and shape to removably fit around the exterior of phone 102. Case 100 provides protection for at least a portion of the encased phone from damage due to impacts, drops, scratches, and the like.

Case 100 includes an enhanced grip area 114 and a reduced grip area 116. Enhanced grip area 114 can be located around part or all of the outer perimeter of the case to facilitate holding the phone more securely in the hand. Reduced grip area 116 includes the portion of case 100 that does not have enhanced grip. Reduced grip area 116 can include the substantial portion of the back cover of the case. Having reduced grip area 116 on the substantial portion of the back cover of the case facilitates the insertion of the phone into and withdrawal of the phone from pockets, clothing, purses, bags, and other places where phones are held while a person carries the phone.

Enhanced grip area 114 of case 100 has increased grip as compared to reduced grip area 116. Enhanced grip area 114 can have a higher coefficient of friction as compared to reduced grip area 116. Enhanced grip area 114 can be comprised of a material that has a higher coefficient of friction as compared to the material comprising reduced grip area 116. Enhanced grip area 114 can have a higher average surface roughness as compared to reduced grip area 116. Enhanced grip area 114 can be comprised of a material that has a higher average surface roughness as compared to the material comprising reduced grip area 116.

Enhanced grip area 114 can comprise the same material as reduced grip area 116, but be patterned or molded with a texture that increases the coefficient of friction and/or average surface roughness of enhanced grip area 114 as compared to reduced grip area 116. For example, enhanced grip area 114 can include mold texturing specified by a manufacturer, such as a Mold-Tech®. In at least one embodiment, enhanced grip area 114 has a surface texture specified by the Mold-Tech® 11070 specification. In at least one embodiment, reduced grip area 116 has a surface texture specified by the Mold-Tech® 11010 specification. The Mold-Tech specifications are given as an example only. Any surface texture that increases the coefficient of friction and/or average surface roughness of enhanced grip area 114 as compared to reduced grip area 116 is within the scope of the present invention.

Case 100 can also include one or more of the following to allow a user access to various functions of phone 102 while phone 102 is disposed within case 100: camera sensor opening 104, power button cover 106, speaker opening 108, volume button covers 110a and 110b, ringer switch opening 112, and power cord opening 118. Camera sensor opening 104 is an opening in the case for the camera lens and sensors that allows the camera to take pictures and send and receive sensor data. Power button cover 106 can comprise a raised portion of the case adapted to receive and cover the power button of phone 102. By pressing power button cover 106, a user can turn phone 102 off and on. Alternatively, power button cover 106 can be an opening instead of a cover. Speaker opening 108 is an opening in case 100 located so that one or more speakers of phone 102 is uncovered by case 100 for purposes of sound reproduction. Volume button covers 110a and 110b can comprise raised portions of the case adapted to receive and cover the volume buttons of phone 102. By pressing volume button cover 110a and 110b, a user can raise or lower the volume settings of phone 102. Alternatively, volume button covers 110a and 110b can be an opening instead of a cover. Ringer switch opening 112 is an opening in case 100 located so that the switch that turns the ringer of phone 102 off and on is uncovered by case 100 so that a user can actuate the switch. Power cord opening 118 is an opening in case 100 located so that the power cord jack of phone 102 is uncovered by case 100 and able to receive a power cord plug while the phone is disposed in case 100.

Figure 2:
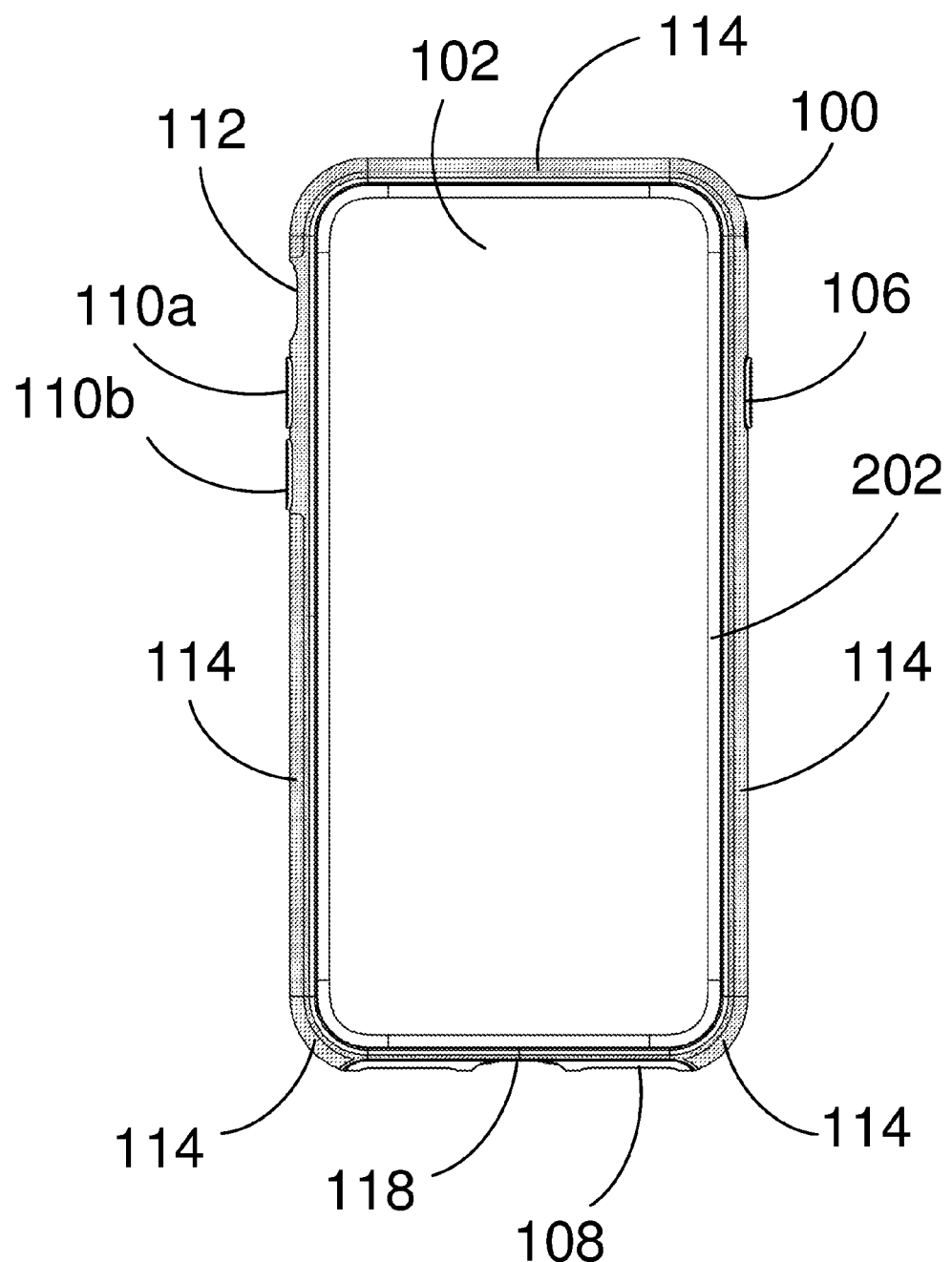
FIG. 2 shows a front view of a mobile phone case (case 100) in accordance with one or more embodiments of the present invention.
Figure 3:
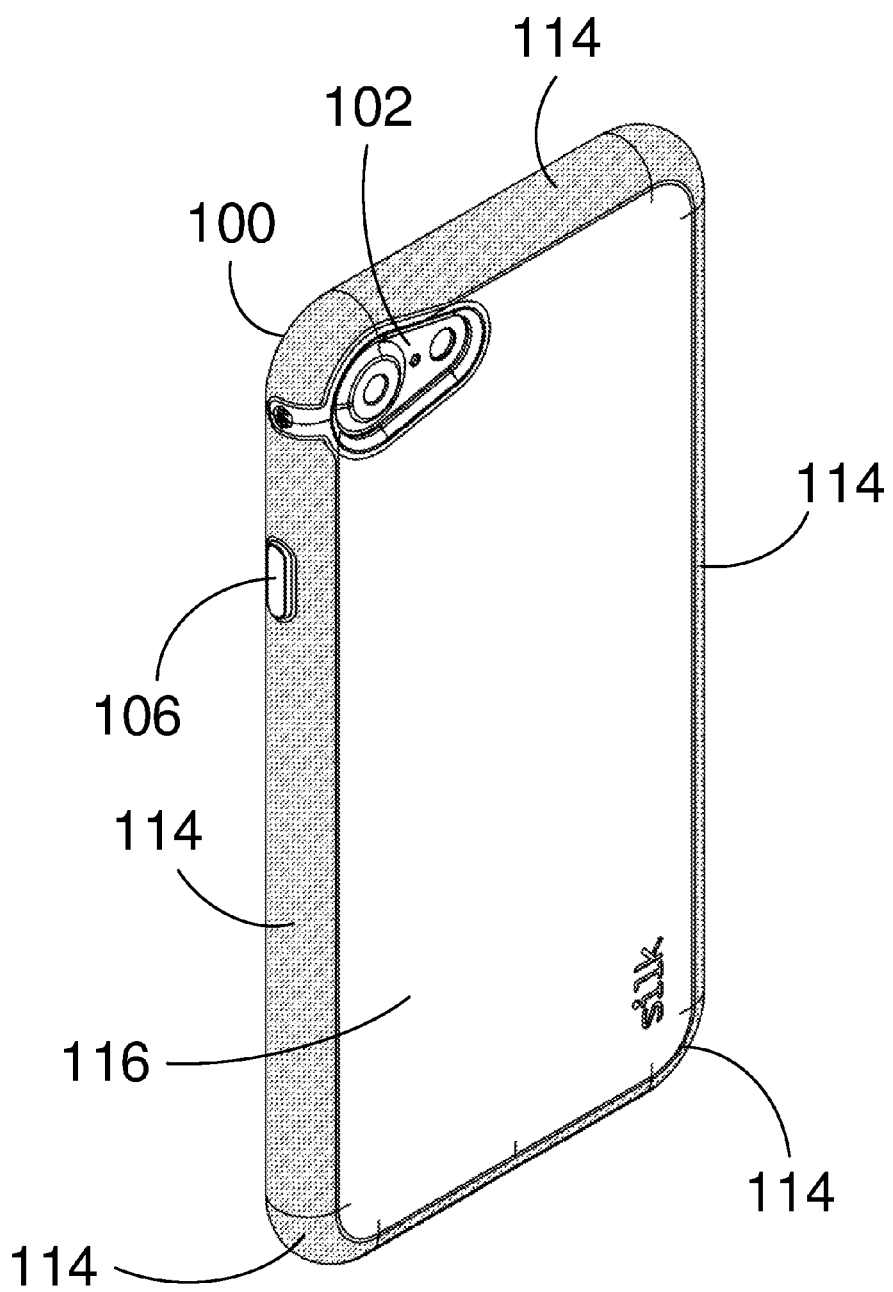
FIG. 3 shows an oblique view of the top, back, and right side of a mobile phone case (case 100) in accordance with one or more embodiments of the present invention.
Figure 4:
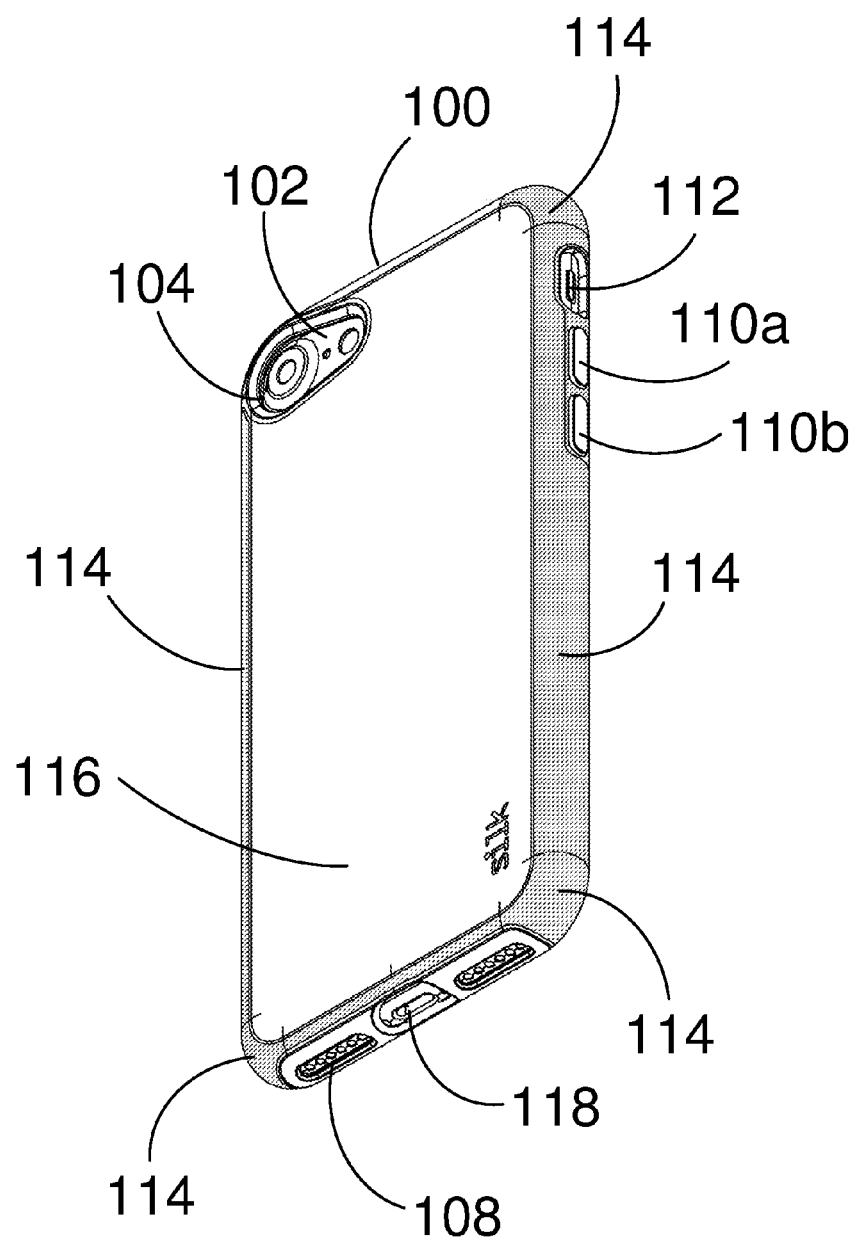
FIG. 4 shows an oblique view of the bottom, back, and left side of a mobile phone case (case 100) in accordance with one or more embodiments of the present invention.

FIG. 2 shows a front view of a mobile phone case (case 100) in accordance with one or more embodiments of the present invention. Display screen opening 202 is adapted in size and location to leave the display screen uncovered and viewable by a user. For a phone with a touchscreen, display screen opening 202 also enables a user to interact with the touchscreen using one or more fingertips and/or a stylus. FIG. 3 shows an oblique view of the top, back, and right side of a mobile phone case (case 100) in accordance with one or more embodiments of the present invention. FIG. 4 shows an oblique view of the bottom, back, and left side of a mobile phone case (case 100) in accordance with one or more embodiments of the present invention.

In at least one embodiment, the case is comprised of a single part. In at least one embodiment, the case is comprised of the same material, but in which enhanced grip area 114 has a different surface texture than reduced grip area 116. In at least one embodiment, the case is comprised of more than one material. For example, the main body of the case can be comprised of thermoplastic polyurethane (TPU), and the openings can be reinforced with polycarbonate (PC) inserts. In at least one embodiment, the enhanced grip area includes the entire outer perimeter of the case. In at least one embodiment, enhanced grip area 114 comprises substantially all of the outer perimeter of the case. In at least one embodiment, enhanced grip area 114 comprises at least 90% of the surface area of the outer perimeter of the case.

The term phone as used herein includes, but is not limited to, mobile phones, cellular phones, smartphones, tablets, tablet computers, phablets, iPhones, iPads, iOS devices, Android devices, Windows Mobile devices, Windows devices, Microsoft Surface devices, Blackberry devices, and the like.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The invention has broad applicability and can provide many benefits as described and shown in the examples above. The embodiments will vary greatly depending upon the specific application, and not every embodiment will provide all of the benefits and meet all of the objectives that are achievable by the invention.

In the following discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not necessarily drawn to scale. The various features described herein may be used in any functional combination or sub-combination, and not merely those combinations described in the embodiments herein. As such, this disclosure should be interpreted as providing written description of any such combination or sub-combination.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A mobile phone case adapted in size and shape to removably fit around the exterior of a mobile phone, comprising: an enhanced grip area; a reduced grip area; an outer perimeter; a back surface; in which the enhanced grip area has increased grip as compared to the reduced grip area; in which the enhanced grip area comprises substantially all of the area of the outer perimeter of the case; in which the back surface is uncovered by the mobile phone when the mobile phone is disposed in the mobile phone case; in which the reduced grip area includes at least a portion of the back surface; and in which the back surface is adjacent to and exclusive of the outer perimeter.

2. The mobile phone case of claim 1 in which the enhanced grip area has an increased coefficient of friction as compared to the reduced grip area.

3. The mobile phone case of claim 1 in which the enhanced grip area has an increased average surface roughness as compared to the reduced grip area.

4. The mobile phone case of claim 1 in which the enhanced grip area has a surface texture that increases the grip of the enhanced grip area as compared to the reduced grip area.

5. The mobile phone case of claim 4 in which the surface texture of enhanced grip area is in accordance with the Mold-Tech 11070 specification.

6. The mobile phone case of claim 5 in which the surface texture of reduced grip area is in accordance with the Mold-Tech 11010 specification.

7. The mobile phone case of claim 1 in which the case is adapted to fit a device selected from a group comprising: cellular phones, smartphones, tablets, tablet computers, phablets, iPhones, iPads, iOS devices, Android devices, Windows Mobile devices, Windows devices, Microsoft Surface devices, and Blackberry devices.

8. The mobile phone case of claim 1 in which the case is comprised of a single part.

9. The mobile phone case of claim 1 in which the case is comprised of the same material, but in which enhanced grip area has a different surface texture than reduced grip area.

10. The mobile phone case of claim 1 in which the enhanced grip area includes the entire outer perimeter of the case.

11. The mobile phone case of claim 1 in which the enhanced grip area and the reduced grip area are disposed on one or more surfaces of the mobile phone case that remain exposed when the mobile phone is disposed in the mobile phone case.

\* \* \* \* \*